March 28, 1950 E. J. WALES 2,501,800

AUTOMATIC SEALING APPARATUS FOR HYDRAULIC SYSTEMS

Filed Dec. 22, 1948

Inventor
Eric J. Wales
By [signature]
ATTORNEY

Patented Mar. 28, 1950

2,501,800

UNITED STATES PATENT OFFICE 2,501,800

AUTOMATIC SEALING APPARATUS FOR HYDRAULIC SYSTEMS

Eric J. Wales, Calgary, Alberta, Canada

Application December 22, 1948, Serial No. 66,783
In Canada December 26, 1947

3 Claims. (Cl. 303—84)

This invention relates to automatic sealing apparatus for hydraulic systems, and it is my object in this invention to provide an apparatus whereby a signal or signals may be flashed into view on a panel, preferably in connection with an automotive vehicle, immediately that any one or all fluid pressure lines in a braking system are rendered out of order due to leakage of the contained fluid, and in consequence of which a breakdown would occur in part or wholly of the system.

The apparatus comprises in its complete form, a conventional master hydraulic assembly and pressure release elements, which are however not shown or described here, excepting references for descriptive purposes. My invented apparatus is the means used for automatically sealing against rupture of the conventional hydraulic pipe lines to prevent loss of fluid and give an indication of any such rupture.

My particular system of sealing has the advantage that it will automatically give instant indication visibly to a driver of the vehicle of any disruption in the braking system, and will consequently forestall the possibility of serious accident when driving in the event of a brake line becoming damaged, or a brake cylinder unit becoming out of order, perhaps gradually.

Another advantage is that the apparatus may be used in other required forms of hydraulic braking, such as one that has one master cylinder applying pressure to any number of lines, and it may be used to seal a line from both ends by attaching one device of my design at the master end of the line, and a similar unit at the brake end of the line. A second line similarly equipped could then be attached between the master cylinder and the brake cylinder to carry the pressure in case of the failure of the first line.

With these objects and advantages mentioned this invention consists in the novel features of construction hereinafter described and claimed, and the drawings accompanying this specification indicate that similar numerals refer to similar parts through the different views.

Figure 1:
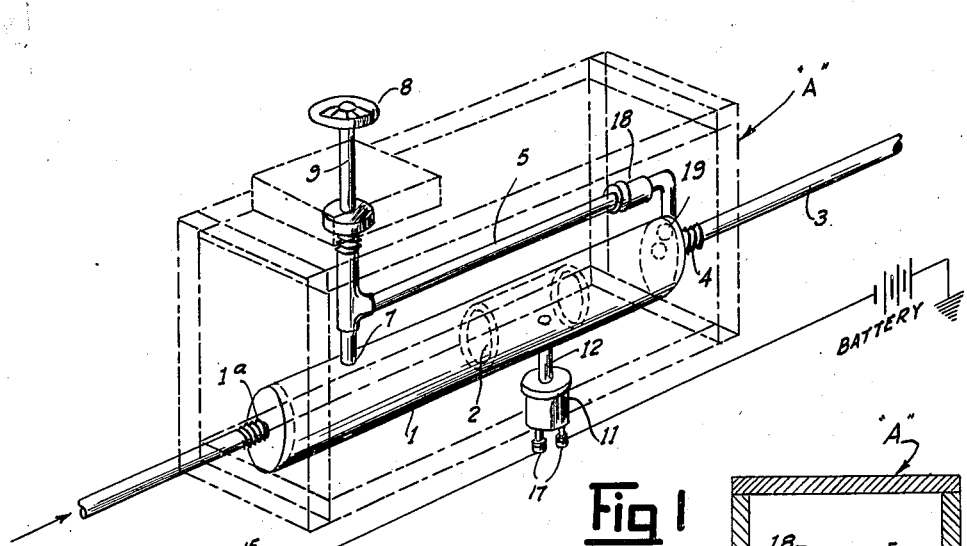
Fig. 1 is a perspective view schematically represented.
Figure 4:
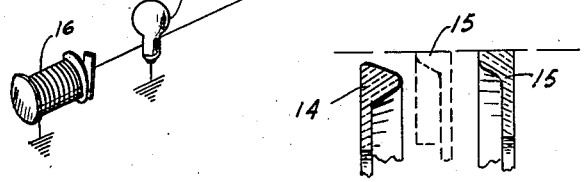
Figure 3:
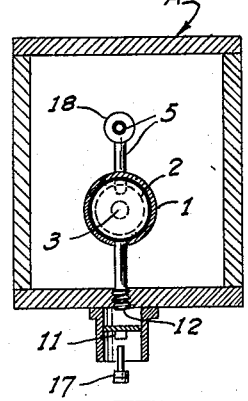
Fig. 3 is a vertical cross section on line 3—3 in Fig. 2.
Figure 2:
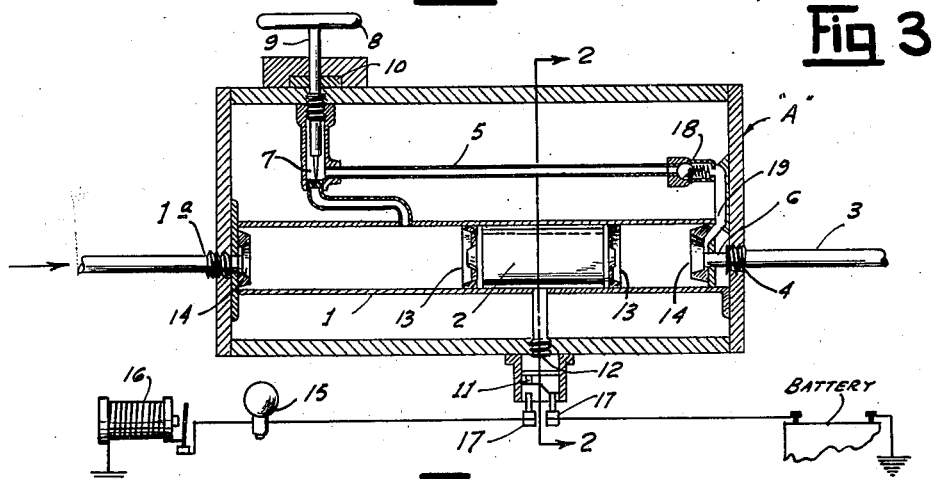
Fig. 2 is a vertical longitudinal section in elevation through the centre line of the enclosed cylinder.

Fig. 4 is a fragmented sectional detail of the flange sealing rings and their reception rings on the piston Referring to the drawings, A is the containing case for one single unit comprising in itself a complete control device, and enclosing the invented apparatus. Each such unit consists of a cylinder 1, in which is a slidable piston 2, the said piston being immediately in the flow path of the fluid between a master pressure-inducing brake element (not shown) having a pipe line 3 connected to the said cylinder, and the outlet end 4 of the said cylinder, this outlet leading to a brake cylinder (not shown). The case A is disposed close to the master cylinder, there being one case and the contents for each wheel brake, so that each brake line may be sealed independently, or in any manner of line combinations.

Since the piston 2 acts as a block in the fluid flow line a by-pass pipe 5 is necessary to allow fluid pressure to be normally transmitted to its cylinder at the brake. This by-pass leads from the cylinder 1 near the intake thereof to the outlet pipe 6 of this cylinder 1. This by-pass is controlled by a needle valve 7 conveniently operable from the outside of the case A, as shown by a handle 8 and a threaded stem 9, the stem being sealed at 10.

In introducing fluid into the system it enters one end of the cylinder 1 at the intake end, and also past the valve 7 through the by-pass 5 to the other end of the cylinder. The piston 2 divides the cylinder into two separate fluid-containing chambers with a flow-controlled connection by way of the by-pass therebetween.

A hydraulically operated switch 11 is disposed approximately half way along the cylinder distance, which switch is operated by pressure fluid passing through a passageway 12 apertured through the wall of the case A. This aperture or passageway 12 is shut off from fluid pressure by the piston 2 except at such times as the piston reaches the outlet end 4 of the cylinder. This latter situation is brought about by failure due to leakage in the system between the outlet end of the cylinder and the brake unit itself. The piston has flexible sealing end rings 13, which at the end of a stroke will enclose annular flanges 14 on the case inside end faces. These flanges are so shaped as to fit into recesses 15 around each end of the cylinder-enclosing piston 2, in order to assure properly sealed airtight contacts.

A signal lamp 15a and a buzzer 16 in series therewith are electrically connected up with terminals 17 on the switch 11 in such a way that pressure in the cylinder operates the said switch when the piston 2 is at the end of its stroke in the outlet direction.

In order to assure a positive one way flow of fluid in the by-pass 5 a ball and spring check valve 18 is inserted in the line. The by-pass is passaged through the end wall of the case A at 19, delivering into that end of the cylinder and the brake line.

The operational features of this apparatus are here outlined, which include the method adopted to install and prepare same in readiness for use. Prior to the introduction of brake fluid the piston 2 is set at that end of its brake stroke near the intake 1a of the cylinder, connection is made with the hydraulic system at this end, the needle valve 7 is closed, and the bleeder valve in a conventional brake cylinder is opened. Fluid is then pumped through the intake pipe 3 into the cylinder pushing the piston to the far end of its stroke to fill same up to the piston face. The needle valve is then opened and fluid further pumped from the master cylinder source of pressure, and it is diverted through the by-pass 5 and the check valve 18, entering the cylinder at the outlet end 4, and filling the brake line and brake cylinder, at the same time forcing out the air therefrom. The said bleeder valve is then closed, and pressure from the master cylinder will then force fluid to operate the pistons in the brake cylinder. On release of master cylinder pressure the brake cylinder pistons will come together to force fluid pressure back into the near end of the cylinder 1. The fluid pressure exerts itself slightly against the spring in the check valve 7 which will consequently force the piston 2 towards the intake end of the cylinder 1. Any further pressure from the master cylinder will exert pressure equally against both faces of the piston as well as through the by-pass 5, and again expand the pistons apart in the brake cylinder. On release of the master cylinder pressure the piston 2 will be forced towards the outlet end 4 of the cylinder 1, the length of its movement depending on the amount of fluid forced through the by-pass. This procedure of pumping and releasing pressure by and from the master cylinder may be repeated until the piston 2 blocks the intake end of the by-pass 5 so that the piston 2 will not return past the by-pass opening.

The space from the intake point in the cylinder 1 to the by-pass opening is necesary to allow for expansion of the fluid due to heating. The by-pass 5 is then closed by means of the needle valve 7, and the system is in readiness for operation. The piston 2 will now move back and forth, and in one direction transmitting pressure from the intake end of the cylinder 1 to the outlet end 4 thereof, when pressure from the master cylinder is applied and released.

Since the piston 2 is leak-proof it will pump exactly the right quantity of fluid to expand a brake cylinder to its fullest extent. Should, however, a break occur in any part of the hydraulic system between the outlet 4 to the brake locale the piston 2 will be forced towards the outlet end of the cylinder 1, when brake pressure from the master cylinder is supplied by the driver. When this pressure is released the piston 2 will be stationary and will not travel towards the intake end of the cylinder 1, since the amount of fluid in the hydraulic system between my unit and the brake has been lessened due to the break in a line. As the fluid has leaked away the piston 2 will contact the outlet end of the cylinder 1 to prevent further leakage. The balance of the cylinder 1 will then be full of fluid. Thus this particular line in my system of units may be out of commission without affecting the other brake lines. When the above mentioned fault has taken place the switch passageway 12 is exposed to pressure to close the electrical contacts and operate the signal and buzzer to indicate the particular line and braken unit which is out of order. When the line and brake unit are repaired the procedure for replenishing same with brake fluid is as previously described.

It is to be understood that whereas a single sealing unit has been described and shown, several such units could advantageously be integrated within one enclosing case. Also whereas a needle valve 7 is mentioned this could be any type of valve suitable for the purpose of control of fluid through the by-pass 5.

The relative position of the piston 2 with the outlet in the end wall of the cylinder must be such that the factors of shrinkage of fluid due to cold, an overlap reserve to take care of slight seepage through the line and brake unit, and evaporation, must be carefully taken into account. Also allowance as to this relative position must be provided for in the period when application of pressure to brake unit actually takes place.

What I claim and desire to secure by Letters Patent is:

1. An automatic fluid sealing device for disposition in series with a hydraulic brake line comprising a cylinder having a slidable fluid-sealing piston therein, an intake aperture at one end of said cylinder connecting with the brake line, a by-pass tube leading from the intake end of said cylinder to the outlet thereof, valvular means to stop the fluid flow through said by-pass tube, a spring held valve in said by-pass tube to assure only one way flow therethrough towards the outlet end of the unit, hydraulic means to operate signal apparatus by compressed fluid escaping through an outlet in said cylinder only when said outlet is uncovered by said piston, as when a leak occurs in a brake line or a brake unit assembly inducing the piston to move to the outlet end of the cylinder.

2. A hydraulic sealing device of the character described as used in the event of leakage in a brake line or brake unit assembly, comprising a cylinder having a by-pass tube communicating from one end to the other end, a piston freely reciprocal within said cylinder, an intake pipe at one end of the cylinder adjacent to the intake of said by-pass tube, an outlet aperture at the opposite end of the cylinder to the said intake pipe communicating with a conventional brake line, a hand operated valve in said by-pass tube to stop the flow therethrough when filling the cylinder with pressurized fluid, means to check the reverse flow through said by-pass tube when said valve is open, an outlet in the cylinder so disposed as to open when the piston is at the extreme outlet end of the cylinder, and an electric switch to operate one or more warning signals, hydraulically controlled when the piston is at the outlet end of the cylinder and exposing said outlet in the cylinder.

3. A hydraulic sealing device to automatically operate warning signals in the event of breakdown in a hydraulic line, comprising a cylinder, a flow checking piston therein, a pressurized fluid intake pipe entering said cylinder, an outlet pipe from said cylinder communicating with the hydraulic line, a by-pass tube communicating between both ends of the cylinder and the said outlet pipe, a valve to check the flow of fluid through the by-pass tube on the initial introduction of pressurized fluid into the cylinder, a check valve in the by-pass tube to assure one way flow therethrough when said flow-checking valve is open, flexible annular flanges on the faces of the cylinder end walls and each face of the piston for the interengagement to stop fluid leakage, and by their contacts to expel accumulated air from the cylinder, and an outlet port in the cylinder wall to be opened and closed by said slidable piston and the flanges for the hydraulic operation of an electric switch controlling warning signals when the said port is open.

ERIC J. WALES.

REFERENCES CITED

The following references are of record in the file of this patent:

UNITED STATES PATENTS

| Number | Name | Date |
|---|---|---|
| 1,726,484 | Gleason et al. | Aug. 27, 1929 |
| 1,922,252 | Martini | Aug. 15, 1933 |
| 2,077,646 | Snyder | Apr. 20, 1937 |
| 2,201,523 | Derrig | May 21, 1940 |